United States Patent [19]

Desmond

[11] 4,054,643

[45] Oct. 18, 1977

[54] MANUFACTURE OF $\gamma$-FE$_2$O$_3$

[75] Inventor: Margaret M. Desmond, Wallingford, Pa.

[73] Assignee: Suntech, Inc., St. Davids, Pa.

[21] Appl. No.: 682,427

[22] Filed: May 3, 1976

[51] Int. Cl.$^2$ ............................................. C01G 49/02
[52] U.S. Cl. ..................................................... 423/634
[58] Field of Search ............... 423/634, 151, 152, 140, 423/142

[56] References Cited

U.S. PATENT DOCUMENTS

| 2,560,970 | 7/1951 | Martin | 423/634 |
| 2,560,971 | 7/1951 | Martin | 423/634 |
| 3,082,067 | 3/1963 | Hund | 423/634 |
| 3,743,707 | 7/1973 | Iwase et al. | 423/634 |
| 3,912,646 | 10/1975 | Leitner et al. | 423/633 |

FOREIGN PATENT DOCUMENTS

| 2,162,716 | 6/1973 | Germany | 423/634 |

OTHER PUBLICATIONS

Mayne, "The Oxidation of Ferrous Hydroxide," J. of the Chemical Society, 1953, pp. 129-132.
Arden, "The Solubility Products of Ferrous and Ferrosic Hydroxides," J. of the Chemical Society, (1950), pp. 882-885.
Chemical Abstracts, vol. 53, pp. 15843-15844.

*Primary Examiner*—O. R. Vertiz
*Assistant Examiner*—Wayne A. Langel
*Attorney, Agent, or Firm*—J. E. Hess; D. R. Johnson; P. Lipsitz

[57] ABSTRACT

A process for the preparation of essentially pure ferromagnetic $\gamma$-Fe$_2$O$_3$ by bringing a solution of a water soluble iron salt to a pH between about 8.0 and 11.0 to obtain a suspension of iron hydroxide, passing air through the iron hydroxide suspension at a temperature of from about 25° to about 80° C., and separating said pure $\gamma$-Fe$_2$O$_3$.

7 Claims, No Drawings

MANUFACTURE OF γ-FE$_2$O$_3$

It is known to make ferromagnetic γ-Fe2O3 (gamma-Fe2O3) by a variety of techniques. When such γ-Fe2O3 is to be used for the manufacture of magnetic tape, however, it must be of very high purity and free of other related oxides. γ-Fe2O3 is generally prepared by oxidizing aqueous solutions of ferrous ions with air at low pH (5.5 and lower). The hydrated ferric oxide which precipitates is dried and dehydrated at 250° C. to γ-Fe2O3. Then, this ferric oxide must be carefully reduced to magnetite (Fe3O4) with hydrogen and reoxidized in air to yield, finally, the γ-Fe2O3.

U.S. Pat. No. 3,082,067 discloses another method for the preparation of γ-Fe2O3 by precipitation and air oxidation of an aqueous iron solution at a pH of 4.5 to 7 to give γ-FeO(OH) which is separated and dehydrated to γ-Fe2O3. Such multistep procedures are, of course, very inefficient.

It is also known in the art from the article by J.E.O. Mayne, J. of the Chemical Society, 1953, p. 129, that when an aqueous solution of am iron salt is precipitated under various pH conditions different compositions are formed. At high pH levels compounds were formed in 70 to 75% conversion which, by X-ray powder photographs, were of a cubic structure corresponding to either Fe3O4 or γ-Fe2O3. This is consistent with a later disclosure (C.A. 53 15843-15844) teaching that oxidation of Fe(OH)2 precipitates with oxygen at room temperature at pH 8–9 gave a mixture of Fe3O4 and γ-Fe2O3.

It has now been found that essentially pure γ-Fe2O$_3$ can be prepared in a single step, thus avoiding the need to isolate a hydrate which must be dehydrated. In accord with the process of the invention pure γ-Fe2O3 is prepared by bringing an aqueous solution of a water-soluble iron salt to a pH between about 8.0 and 11.0 to obtain a suspension of iron hydroxide, passing an oxygen containing gas stream through the iron hydroxide suspension at a temperature of about 25° C. to about 80° C. to convert the iron hydroxide to essentially pure γ-Fe2O3. The time required for the oxidation will vary with the amount of the iron hydroxide treated and with the temperature employed as will be understood by the skilled art worker, but in general, the iron hydroxide suspension will be converted entirely to γ-Fe2O3 over a period of from about 0.3 to about 10 hours.

As indicated any water soluble iron salt may be used such as the sulfate, chloride, nitrate, oxalate and the like. The aqueous iron solution is redily brought to the desired pH level of from about 8.0 to about 11, preferably from about 8.5 to about 10.5, by addition of an aqueous caustic solution (e.g., an alkali metal hydroxide such as NaOH, KOH, etc.) although solutions of ammonia, carbonate, and the like are also useful. Preferably, the alkaline solution is added to the agitated iron solution, preferably under a blanket of nitrogen or other inert gas, although air may be introduced with the alkali solution. When the desired pH has been reached, the addition of alkali is stopped and the suspension of iron hydroxides which formed is heated to a temperature of from about 25° to about 80° C. Alternatively, the iron solution may be added to the aqueous alkaline solution, but such procedure should be practiced only when a pH above about 9 is used. Preferably, the alkaline solution is added to the iron solution. After, the desired temperature is reached, or even as the mass is being heated, a stream of an oxygen containing gas, preferably air, is passed in while the suspension is agitated unitl the desired crystal size is obtained. The product γ-Fe2O3 is then simply filtered off, dried, powdered and is ready for use.

In order to further illustrate the invention the following examples are given.

EXAMPLE 1

FeSO$_4$·7H$_2$O (27.8g.) is dissolved in 250 mls. of distilled water and transferred to a 1000 ml. resin kettle with a four port lid. The resin kettle is fitted with a motor driven stirring paddle, an air bubbler tube, a pH electrode and air condenser. Attached to the pH electrode is a small rubber tube which delivers a sodium hydroxide solution to the reaction vessel. Sodium hydroxide pellets (4.1g.) are dissolved in 250 mls. H$_2$O, placed in a graduated cylinder which is used as a reservoir connected to a peristaltic pump.

The caustic solution is pumped into the ferrous sulfate solution with air bubbling in at 3 liters/min. as the mixture is stirred. At the point at which the desired pH is reached, the reaction kettle, which is suspended in a water bath, is heated to approximately 50° C. and the oxidation reaction is allowed to proceed by the continuous addition of air at this temperature for 5 hours.

The precipitate obtained is filtered through a fine sintered glass funnel, washed with H$_2$O until sulfate free and dried overnight in the oven a approximately 125° C. The material is then ground with a mortar and pestle and submitted for X-ray diffraction analysis. The data shown in Table I are for the several runs made at various pH levels.

TABLE I

| pH | Product by X-Ray Diffraction Analysis |
|---|---|
| 5.0 | FeOOH |
| 5.5 | FeOOH |
| 7.0 | FeOOH |
| 9.5 | Γ-Fe$_2$O$_3$ |
| 12.0 | FeOOH |

EXAMPLE 2

Following the details of Example 1, 21.8 grams of FeCl$_2$·4H$_2$O are substituted for the iron sulfate. Table II shows the data obtained.

TABLE II

| pH At Which Suspension Oxidizes | Product by X-Ray Diffraction Analysis |
|---|---|
| 4.5 | FeOOH |
| 5.5* | FeOOH |
| 7.0 | FeOOH |
| 7.0* | Mostly Γ-Fe$_2$O$_3$ |
| 9.0* | Pure Γ-Fe$_2$O$_3$ |
| 9.5 | Pure Γ-Fe$_2$O$_3$ |
| 11.0 | Pure Γ-Fe$_2$O$_3$ |

TABLE II-continued

| pH At Which Suspension Oxidizes | Product by X-Ray Diffraction Analysis |
|---|---|
| 10.0** | Pure $\Gamma$-$Fe_2O_3$ |

*Reverse addition. Ferrous compound is added to sodium hydroxide solution.
**Reverse addition, but NH$_4$OH solution is used rather than NaOH.

EXAMPLE 3

Additional runs are carried out in accord with the above examples except that a sodium hydroxide solution is added under a blanket of nitrogen and oxidation with air started after the desired pH is reached. The date are shown in Table III.

TABLE III

| Salt Charged | pH | Product by X-Ray Diffraction Analysis |
|---|---|---|
| FeSO$_4$ . 7H$_2$O | 13.4 | FeOOH |
| FeCl$_2$ . 4H$_2$O | 7.5 | FeOOH |
|  | 8.5 | Pure $\Gamma$-$Fe_2O_3$ |
|  | 12.6 | FeOOH |

As can be seen from the above examples, in order to get pure $\gamma$-$Fe_2O_3$, it is necessary to carefully control the pH as described. In addition to simplifying the procedure for making $\gamma$-$Fe_2O_3$, the process of this invention eliminates the problems with crystal sintering experienced by the reduction and oxidation steps in the procedures of the prior art.

The invention claimed is:

1. A process for the preparation of ferromagnetic $\gamma$-$Fe_2O_3$ by bringing a solution of a water soluble ferrous iron salt to a pH of between about 8.5 to about 10.5 by the addition of an aqueous alkaline solution to said iron salt solution under a blanket of an inert gas to obtain a suspension of iron hydroxide, heating said iron hydroxide suspension to a temperature of between about 25° to about 80° C., and passing air through said heated suspension for a period of about 0.3 to 10 hours to form pure $\gamma$-$Fe_2O_3$ and separating said $\gamma$-$Fe_2O_3$.

2. The process of claim 1 wherein said alkaline solution is an alkali metal hydroxide solution.

3. The process of claim 2 wherein the caustic solution is NaOH and the iron salt is ferrous sulfate.

4. The process of claim 2 where the iron salt is ferrous chloride.

5. A process for the preparation of pure ferromagnetic $\gamma$-$Fe_2O_3$ by bringing a solution of a water soluble ferrous iron salt to a pH between about 8.0 and about 11.0 to obtain a suspension of ferrous iron hydroxide, passing an oxygen containing gas through the iron hydroxide suspension at a temperature of from about 25° to about 80° C, and separating pure $\gamma$-$Fe_2O_3$ from the solution.

6. The process of claim 5 wherein the oxygen containing gas is air.

7. The process of claim 6 wherein the pH is brought to between about 8.5 and about 10.5.

* * * * *